United States Patent
Kajiya et al.

(10) Patent No.: US 10,198,854 B2
(45) Date of Patent: Feb. 5, 2019

(54) MANIPULATION OF 3-DIMENSIONAL GRAPHICAL OBJECTS FOR VIEW IN A MULTI-TOUCH DISPLAY

(75) Inventors: James Thomas Kajiya, Duvall, WA (US); Andrew Wilson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 573 days.

(21) Appl. No.: 12/541,167

(22) Filed: Aug. 14, 2009

(65) Prior Publication Data

US 2011/0041098 A1 Feb. 17, 2011

(51) Int. Cl.
  *G06T 15/20* (2011.01)
  *G06F 3/0481* (2013.01)
  *G06F 3/0488* (2013.01)

(52) U.S. Cl.
  CPC .......... *G06T 15/20* (2013.01); *G06F 3/04815* (2013.01); *G06F 3/04883* (2013.01); *G06F 2203/04808* (2013.01)

(58) Field of Classification Search
  CPC .... G06F 3/0346; G06F 3/03544; G06F 3/038; G06F 3/04815; G06F 3/0416; G06F 2203/04104; G06F 3/044; G06F 3/04845; G06F 2203/04106; G06F 3/00; G06F 3/0414; G06F 3/04847; G06F 3/0488; G06F 2203/04808; G06F 3/0236; G06F 3/0482; G06F 3/04842; G06F 3/0485
  USPC .................. 715/702, 764; 345/173
  See application file for complete search history.

(56) References Cited

U.S. PATENT DOCUMENTS

| | | | |
|---|---|---|---|
| 4,999,553 A * | 3/1991 | Seraji | B25J 9/1643 318/628 |
| 6,157,367 A * | 12/2000 | Van Der Haar et al. | 715/856 |
| 6,192,266 B1 * | 2/2001 | Dupree et al. | 600/427 |
| 6,246,390 B1 | 6/2001 | Rosenberg | |
| 6,597,347 B1 * | 7/2003 | Yasutake | G06F 3/0338 345/173 |
| 7,466,303 B2 | 12/2008 | Yi et al. | |
| RE40,891 E * | 9/2009 | Yasutake | 345/173 |

(Continued)

FOREIGN PATENT DOCUMENTS

EP 973123 A1 * 1/2000 ............. G06K 11/18

OTHER PUBLICATIONS

Hancock et al. Rotation and Translation Mechanisms for Tabletop Interaction, available to search engine by Oct. 22, 2005.*

(Continued)

*Primary Examiner* — Abdullah Al Kawsar
*Assistant Examiner* — Carl P Lobo
(74) *Attorney, Agent, or Firm* — Medley, Behrens & Lewis, LLC

(57) ABSTRACT

A system described herein provides six degrees of freedom with respect to a three-dimensional object rendered on a multi-touch display through utilization of three touch points. Multiple axes of rotation are established based at least in part upon location of a first touch point and a second touch point on a multi-touch display. Movement of a third touch point controls appearance of rotation of the three-dimensional object about two axes, and rotational movement of the first touch point relative to the second touch point controls appearance of rotation of the three-dimensional object about a third axis.

15 Claims, 10 Drawing Sheets

(56) References Cited

U.S. PATENT DOCUMENTS

| | | | |
|---|---|---|---|
| 7,743,348 B2* | 6/2010 | Robbins et al. | 715/863 |
| 8,456,466 B1* | 6/2013 | Reisman et al. | 345/419 |
| 8,493,384 B1* | 7/2013 | Reisman | G06F 3/0425 |
| | | | 345/419 |
| 8,799,821 B1* | 8/2014 | De Rose | G06F 3/04842 |
| | | | 715/821 |
| 2002/0158838 A1* | 10/2002 | Smith et al. | 345/156 |
| 2003/0193572 A1* | 10/2003 | Wilson | G08C 17/00 |
| | | | 348/207.99 |
| 2004/0164956 A1* | 8/2004 | Yamaguchi et al. | 345/156 |
| 2004/0193413 A1* | 9/2004 | Wilson | G06F 3/017 |
| | | | 704/243 |
| 2006/0020898 A1* | 1/2006 | Kim et al. | 715/764 |
| 2006/0026521 A1* | 2/2006 | Hotelling et al. | 715/702 |
| 2006/0028476 A1* | 2/2006 | Sobel | G06T 13/00 |
| | | | 345/474 |
| 2006/0082546 A1* | 4/2006 | Wey | G06F 3/0346 |
| | | | 345/156 |
| 2007/0120846 A1* | 5/2007 | Ok | G06F 3/04815 |
| | | | 345/419 |
| 2007/0146325 A1* | 6/2007 | Poston | G06F 3/0317 |
| | | | 345/163 |
| 2007/0252821 A1* | 11/2007 | Hollemans et al. | 345/173 |
| 2008/0062126 A1* | 3/2008 | Algreatly | G06F 3/02 |
| | | | 345/157 |
| 2008/0180406 A1* | 7/2008 | Han et al. | 345/173 |
| 2008/0298672 A1* | 12/2008 | Wallack | G06K 9/32 |
| | | | 382/154 |
| 2008/0306379 A1* | 12/2008 | Ikuma | A61B 5/06 |
| | | | 600/424 |
| 2009/0138800 A1* | 5/2009 | Anderson et al. | 715/702 |
| 2009/0201261 A1* | 8/2009 | Day | 345/173 |
| 2009/0278812 A1* | 11/2009 | Yasutake | G06F 3/04815 |
| | | | 345/173 |
| 2009/0284478 A1* | 11/2009 | De la Torre Baltierra et al. | |
| | | | 345/173 |
| 2009/0303231 A1* | 12/2009 | Robinet et al. | 345/419 |
| 2010/0214232 A1* | 8/2010 | Chan | G06F 3/044 |
| | | | 345/173 |
| 2011/0012848 A1* | 1/2011 | Li | G06F 3/0416 |
| | | | 345/173 |
| 2011/0069019 A1* | 3/2011 | Carpendale | G06F 3/0425 |
| | | | 345/173 |

OTHER PUBLICATIONS

"System Description", 1996, Retrieved at <<http://research.microsoft.com/en-us/um/people/kenh/thesis/system.htm >>, pp. 1-24.

Chen, Elaine., "Six Degree-of-Freedom Haptic System for Desktop Virtual Prototyping Applications", Jun. 1999, Retrieved at <<http://www.sensable.com/documents/documents/6dof_Laval.pdf >>, pp. 1-10.

Moscovich, et al., "Multi-Finger Cursor Techniques", Retrieved at <<http://www.moscovich.net/tomer/papers/multifcursos-gi2006.pdf >>, pp. 1-7.

"Interactive Form Creation", Sep. 2001, Retrieved at <<http://eprints.ucl.ac.uk/240/1/AvaFgSchieck_Thesis2001.pdf >>, pp. 1-42.

"Natural Interaction with Virtual Objects Using Vision-Based Six DOF Sphere Tracking", Jan. 2007, Retrieved at <<http://romain.vergne.free.fr/ir/ir_doc.pdf >>, pp. 1-9.

* cited by examiner

MANIPULATION OF 3-DIMENSIONAL GRAPHICAL OBJECTS FOR VIEW IN A MULTI-TOUCH DISPLAY

BACKGROUND

Touch screen technology has advanced in recent years such that touch screen technology can be found in many consumer-level devices and applications. For example, banking machines often include a touch-sensitive graphical user interface that allows users to select a function (e.g., withdrawal or deposit) and an amount for withdrawal or deposit. In another example, mobile telephones or mobile media players can include touch screen technology, wherein such technology can be employed in connection with user selection of graphical icons on an interactive interface with the use of a stylus. In still yet another example, some laptop computers are equipped with touch screen technology that allows users to generate signatures, select applications, and perform other tasks with the use of a stylus or their fingers.

The popularity of touch screen technology has increased due to ease of use, particularly for novice computer users. For instance, novice computer users may find it more intuitive to select a graphical icon by hand than to select the icon through use of various menus and a pointing and clicking mechanism, such as a mouse. In currently available systems, users can select, move, modify, or perform other tasks on objects that are visible on a display screen by selecting such objects (e.g., with a stylus or their finger).

A common problem in applications that need three-dimensional interfaces, such as mechanical computer-aided drafting applications, computer game programming applications, animation software, and general three-dimensional user interfaces is that it is difficult to position and orient rigid objects. Unlike objects in a two-dimensional plane, which only have two translational and one rotational degree of freedom, objects in three-dimensional space have three translational and three rotational degrees of freedom.

Some current techniques for manipulating three dimensional objects on a graphical user interface use special hardware interfaces, such as virtual reality gloves, which can be used to grab objects and place them in space. Another example hardware interface is a six degree of freedom input device such as a spaceball. These hardware solutions tend to be relatively expensive. Software-based methods using ordinary mice, trackballs, and keyboards are cheap but inadequate in that users often find three dimensional objects difficult to control when using such software-based methods. That is, the behaviour of the object on the screen is non-intuitive to the point that positioning and orienting a three-dimensional object precisely is extremely difficult.

As indicated above, touch screen technology has become more prevalent, particularly in connection with mobile devices such as portable telephones and portable media players. Many of these touch sensitive display devices include multi-touch functionality, such that a user can utilize multiple members (fingers) to cause objects to act in a particular manner. Conventionally, there is no suitable manner to position and orient a three-dimensional object rendered in a graphical user interface on a multi-touch display surface.

SUMMARY

The following is a brief summary of subject matter that is described in greater detail herein. This summary is not intended to be limiting as to the scope of the claims.

Various technologies pertaining to rendering three-dimensional objects on a multi-touch display are described in detail herein. Specifically, technologies that facilitate positioning and orienting three-dimensional objects with six degrees of freedom are described in detail herein. The multi-touch display may have a three-dimensional object displayed thereon that can be translated and rotated in three-dimensional space, or can be made to appear as if the three-dimensional object is translated and rotated in three-dimensional space (e.g., the camera can be moved while the object remains in a constant position). This appearance of translation and/or rotation can be accomplished through utilization of one or more touch points. For instance, a user can utilize a first member and a second member to establish a first axis of rotation with respect to the three-dimensional object, wherein the first axis of rotation lies in a plane that is substantially parallel to the surface of the multi-touch display. For example, the first axis of rotation can be established through the centroid of the three-dimensional object, where orientation of the first axis can be substantially parallel to a line between the first touch point and the second touch point. The user may then utilize a third member to cause the three-dimensional object to rotate about such first axis. For instance, the user can move a third finger over the touch-sensitive display in a direction that is substantially perpendicular to the line between the first touch point and the second touch point. This can cause the three-dimensional object to appear to be rotated about the first axis (e.g., the three-dimensional object can be rotated about the first axis or a camera capturing the three-dimensional object can be rotated about the first axis).

Additionally, a second axis that is in the plane that is substantially parallel to the surface of the multi-touch display can be automatically generated, wherein such second axis is substantially perpendicular to the first axis. The user may also cause the three-dimensional object to appear to rotate about such second axis. In an example, the user can move the third member in a direction that is substantially parallel to the line that connects the first touch point and the second touch point, and movement of such third member can cause the three-dimensional object to appear to rotate about such second axis.

Additionally, the user may employ two members to cause the three-dimensional object to appear to rotate about a z-axis (e.g., the axis that is substantially perpendicular to the plane of the surface of the multi-touch apparatus). In an example, the user can cause the three-dimensional object to appear to rotate about such z-axis by rotating the first touch point and/or the second touch point with respect to the second touch point and/or the first touch point, respectively on the multi-touch display. Direction of movement of the first touch point and/or second touch point relative to the other touch point can control direction of appearance of rotation about the z-axis.

Furthermore, the user can employ two touch points to change the scale of the three-dimensional graphical object or change the view depth of the three-dimensional graphical object. For instance, by increasing distance between the first and second touch point, the user can cause the three-dimensional graphical object to be scaled upwardly (e.g., the size of the three-dimensional graphical object can be increased). By decreasing the distance between the first and second touch points, the user can cause the three-dimensional graphical object to be scaled downwardly. In another embodiment, rather than altering the scale of the graphical object, changing distance between the first and second touch points can cause the view depth to be altered. For instance, increasing distance between the first and second touch points can cause the view distance to be decreased while decreasing distance between the first and second touch points can cause the view depth to be decreased.

Other aspects will be appreciated upon reading and understanding the attached figures and description.

DETAILED DESCRIPTION

Figure 1:
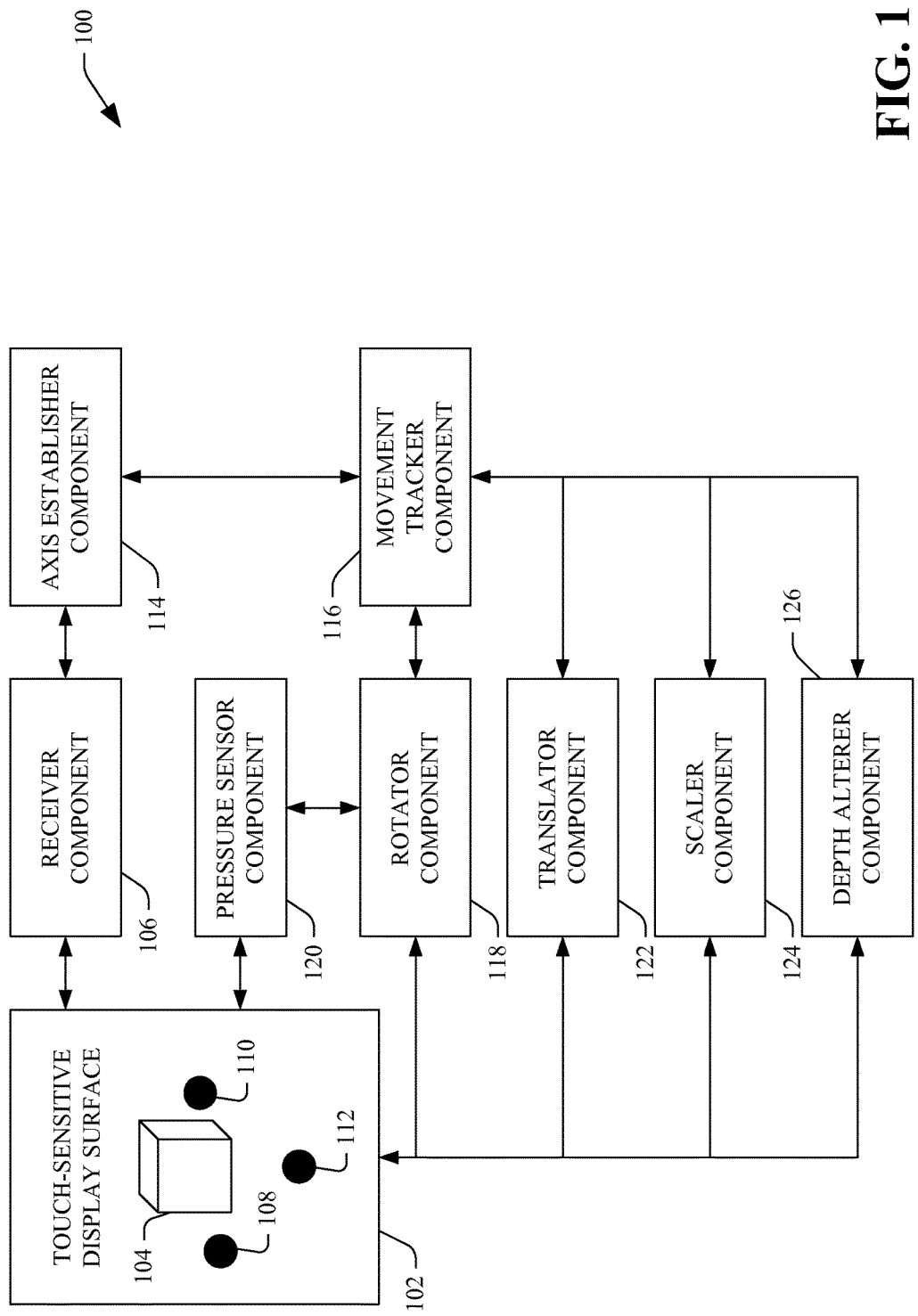
FIG. 1 is a functional block diagram of an example system that facilitates providing six degrees of freedom with respect to a graphical object on a multi-touch display.

Various technologies pertaining to multi-touch displays will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates providing six degrees of freedom with respect to a three-dimensional graphical object displayed on a multi-touch display is illustrated. For instance, the system 100 may be included in a portable multi-touch apparatus, such as a multimedia device, a portable telephone, a laptop, or other suitable device. In another example, the system 100 may be included in a desktop computer, a multi-touch tabletop surface computing device, or other suitable computing device.

The system 100 includes a touch-sensitive display surface 102 that has multi-touch functionality associated therewith. Thus, multiple members may be utilized to interact with graphical items displayed on the touch-sensitive display surface 102. The touch-sensitive display surface 102 may be or include any suitable touch-sensitive display technology including but not limited to resistive technologies, surface acoustic wave technologies, capacitive technologies, projected capacitive technologies, infrared technologies, strain gauge technologies, optical imaging technologies, dispersive signal technologies, acoustic pulse recognition technologies, or any other suitable technologies that can be utilized in connection with detecting multiple touches on the touch-sensitive display surface 102.

A three-dimensional object 104 is displayed on the touch-sensitive display surface 102. The system 100 includes a receiver component 106 that can receive an indication that multiple members of a user (multiple fingers/thumbs) are in contact with the touch-sensitive display surface 102 with respect to the three-dimensional object 104. Furthermore, the receiver component 106 can receive indications pertaining to an order that the members came into contact with the touch-sensitive display surface 102. For instance, the receiver component 106 can first receive an indication that a first member has come into contact with a touch-sensitive display surface 102 at a first touch point 108, that a second member has come into contact with the touch-sensitive display surface 102 thereafter at a second touch point 110, and that a third member of the user has come into contact with the touch-sensitive display surface 102 at a third touch point 112 after the second member has come into contact with the touch-sensitive display surface 102. Additionally or alternatively, the receiver component 106 can receive an identity of which member has come into contact with the touch-sensitive display surface 102 at particular touch points. For example, it can be ascertained that the first touch point 108 corresponds to a pointer finger of a certain hand of the user, the second touch point 110 corresponds to a thumb of a certain hand of the user, and the third touch point 112 corresponds to a middle finger of a certain hand of the user. Determining identities of members that come into contact with the touch-sensitive display surface 102 can be undertaken, for instance, through fingerprint analysis, by analyzing size and shape of touch points, by inferring which members correspond to which touch points based upon pressure applied to the touch-sensitive display surface, or other suitable technique.

The system 100 further includes an axis establisher component 114 that is in communication with the receiver component 106 and can receive data pertaining to the touch points 108-112 from the receiver component 106. For instance, the axis establisher component 114 can receive an indication of an order of occurrence of the touch points 108-112 on the touch-sensitive display surface 102. In another example, the axis establisher component 114 can receive identities of members that correspond to the touch points 108-112. Based at least in part upon locations on the touch-sensitive display surface 102 of two of the touch points 108-112, the axis establisher component 114 can establish a first axis about which the three-dimensional graphical object can be rotated. For instance, the axis establisher component 114 can establish such first axis based at least in part upon an order that the touch points 108-112 where established on the touch-sensitive display surface 102. For example, the axis establisher component 114 can establish the first axis based upon locations of the first two touch points that occurred in time (when compared to the third touch point).

Thus, if the touch point 108 was established first in time when compared to the touch points 110 and 112, and the touch point 110 was established prior to the touch point 112 being established, then the axis establisher component 114 can establish the aforementioned first axis based at least in part upon the location of the first touch point 108 and the location of the second touch point 110 on the touch-sensitive display surface 102. Additionally, if the first touch point 108 and/or the second touch point 110 change location (e.g., the user moves the first member and/or the second member along the touch-sensitive display surface 102), the axis establisher component 114 can re-establish the first axis based at least in part upon the new position(s) of the first touch point 108 and/or the second touch point 110.

In another embodiment, the axis establisher component 114 can establish the first axis based at least in part upon identities of members utilized to establish the touch points. Thus, the axis establisher component 114 can establish the first axis based upon locations of touch points pertaining to, for instance, a middle finger and a thumb of the user regardless of an order that the user placed members on the touch-sensitive display surface 102.

The first axis established by the axis establisher component 114 can be in a plane that is substantially parallel to the touch-sensitive display surface 102. For instance, the first axis can be established through a centroid of the three-dimensional graphical object 104 in the plane that is substantially parallel with the touch-sensitive display surface 102, wherein the orientation of the first axis is substantially parallel to a line that connects the first touch point 108 and the second touch point 110. In yet another example, as will be shown in detail below, the first axis established by the axis establisher component 114 may be the line that connects the first touch point 108 and the second touch point 110 (e.g., the first axis connects the touch points 108 and 110).

Furthermore, the axis establisher component 114 can establish a second axis that is substantially perpendicular to the aforementioned first axis, wherein the second axis also lies in the plane that is substantially parallel to the touch-sensitive display surface 102. Again, for instance, the second axis may be positioned through the centroid of the three-dimensional graphical object 104. In an alternative embodiment, where the first axis connects the first touch point 108 and the second touch point 110, the axis establisher component 114 can establish the second axis at substantially the midpoint between the first touch point 108 and the second touch point 110, for instance, wherein the second axis is again substantially perpendicular to the first axis. In such an embodiment, the three-dimensional object 104 can be revolved and rotated about the second axis.

The system 100 additionally includes a movement tracker component 116 that can determine that the third touch point 112 has moved along the touch-sensitive display surface 102. For instance, the third touch point 112 may transition from a first location on the touch-sensitive display surface 102, along the touch-sensitive display surface 102, to a second location. Pursuant to an example, the movement tracker component 116 can monitor movement of the third touch point 112 to ensure that the third touch point 112 remains on the touch-sensitive display surface 102 (e.g., the user does not pick up the third member).

A rotator component 118 can be in communication with the movement tracker component 116, and can cause a three-dimensional object 104 to appear to rotate about at least one of the first axis and the second axis established by the axis establisher component 114 based at least in part upon movement of the third touch point 112 detected by the movement tracker component 116. As used herein, the term "appear to rotate" is intended to encompass rotation of the three-dimensional object 104 about the first axis and/or the second axis as well as rotation of a viewing perspective (e.g., a camera) about the first axis and/or the second axis. In the case where the three-dimensional object rotates about the axis, coordinates of the three-dimensional object can change. In the case where the viewing perspective rotates, the coordinates of the three-dimensional object remain unchanged. Whether the three-dimensional object rotates about the first axis and/or the second axis or the viewing perspective rotates about the first axis and/or second axis can be based upon user commands.

In an example, if the third touch point 112 is moved substantially perpendicularly to the first axis established by the axis establisher component 114, then the rotator component 118 can cause the three-dimensional graphical object 104 to appear to rotate about the first axis. In another example, if the movement tracker component 116 detects that the third touch point 112 is moved substantially parallel to the first axis, then the rotator component 118 can cause a three-dimensional graphical object 104 to appear to be rotated about the second axis. In still yet another example, if the movement tracker component 116 detects that the third touch point 112 is moved in a diagonal manner from the first axis, then the rotator component 118 can cause the three-dimensional graphical object 104 to appear to be rotated simultaneously about the first axis and the second axis in a direction that corresponds to movement of the third touch point 112.

In an example embodiment, the rotator component 118 can be configured to restrict appearance of rotation about the first axis or the second axis (e.g., upon a choice being made by the user). For instance, the user may not be able to sufficiently control movement of the third touch point 112 with a third member (e.g., the user thinks she is moving the third touch point 112 substantially perpendicular to the first axis but is in actuality moving the third touch point 112 diagonally from the first axis). Then the user can restrict appearance of rotation about a desired axis (e.g., movement of the third touch point 112 in a direction inconsistent with the desired rotation may be zeroed out).

The system 100 may further include a pressure sensor component 120 that is configured to detect a pressure that is applied by one or more of the members of the user that correspond to the touch points 108-112. For instance, the touch-sensitive display surface 102 may be configured with technologies that allow pressure applied to the touch-sensitive display surface 102 to be ascertained. In an example, size of a touch point can be indicative of pressure applied to the touch-sensitive display surface 102, as a touch point of greater size indicates that a greater surface area of a member of the user is in physical contact with the touch-sensitive display surface 102, and thus a greater amount of pressure is being applied to the touch-sensitive display surface 102 when compared with a size other touch points. In another example, the touch-sensitive display surface 102 can be associated with some sort of stress gauge technology that detects an amount of stress corresponding to one or more of the touch points 108-112.

The pressure sensor component 120 can be in communication with the rotator component 118, and can provide the rotator component 118 with pressure sensed in connection with the touch points 108-112. The rotator component 118 can cause the three-dimensional graphical object 104 to appear to rotate in the touch-sensitive display surface 102 based at least in part upon pressure sensed by the pressure sensor component 120 corresponding to at least one of the touch points 108-112. For instance, the pressure sensor component 120 can cause speed of rotation to be dependent at least in part upon the pressure as detected by the pressure sensor component 120. For example, if the user applies a relatively large amount of pressure with respect to touch points 108 and 110, the rotator component 118 can cause the three-dimensional graphical object 104 to appear to rotate in a certain direction about the first axis established by the axis establisher component 114. In anther example, the pressure applied by a third member corresponding to the third touch point 112 may be used to control speed of appearance of rotation about either the first axis or the second axis established by the axis establisher component 114.

The system 100 may further include a translator component 122 that is in communication with the movement tracker component 116. The translator component 122 can be configured to cause the three-dimensional object 104 to appear to be moved in the plane that is substantially parallel to the touch-sensitive display surface 102 (e.g., the three-dimensional object 104 can be translated or a viewing perspective can be translated). In an example, the touch point amongst the plurality of touch points 108-112 that is associated with an earliest instance in time when compared with instances in time corresponding to the other touch points can be used to translate the three-dimensional object 104 in the plane that is parallel to the touch-sensitive display surface 102. Thus, the user may use a single finger, select the three-dimensional graphical object 104, and move the three-dimensional graphical object 104 to a location in the touch-sensitive display surface desired by the user.

Furthermore, ordering of touch points 108-112 can be remembered, such that if the user is utilizing three touch points to rotate the three-dimensional graphical object 104 and thereafter removes members 110 and 112 to eliminate such touch points, then the touch point 108 may still be employed to translate the graphical object 104 in the plane that is substantially parallel to the touch-sensitive display surface 102. Moreover in an example, as members are removed from the touch-sensitive display surface 102, order can be reassigned. However, in some cases the user may remove a member from the touch-sensitive display surface 102 accidentally. Accordingly, an amount of time that a member is removed from contact with the touch-sensitive display surface can be considered and, if less than a threshold, the ordering of touch points can remain unchanged. In another example, an amount of space between subsequent contacts by a member can be considered when determining whether to re-assign order (e.g., to determine whether the user intended to remove their finger from the touch-sensitive display surface 102). In yet another example, both time and space can be considered when determining whether the user intended to remove a member from the touch-sensitive display surface 102.

A scaler component 124 may also be in communication with the movement tracker component 116, and can cause the three-dimensional graphical object 104 to be scaled in the touch-sensitive display surface 102 based at least in part upon movement of at least one of the first touch point 108 and the second touch point 110 (if such touch points 108 and 110 are used by the axis establisher component 114 to establish the first and second axis). For instance, if the user moves the first member or second member to cause the distance between the first touch point 108 and the second touch point 110 to be decreased, then the scaler component 124 can decrease the scale corresponding to the three-dimensional graphical object 104, thereby causing the three-dimensional graphical object 104 to become smaller. Thus, the user may move both the first member and the second member towards one another along the first axis established by the axis establisher component 114 to cause the three-dimensional graphical object 104 to be reduced in size. In another example, the user may cause the distance between the first touch point 108 and the second touch point 110 to be increased (e.g., by moving one or both of the first member and the second member), and the scaler component can cause the three-dimensional graphical object 104 to be increased in size.

In another example embodiment, rather than altering scale of the three-dimensional graphical object 104 when distance between the two touch points is altered, a view depth pertaining to the graphical object 104 can be altered. Thus, the system 100 may include a depth alterer component 126 that alters the view depth of the user with respect to the three-dimensional graphical object 104 based at least in part upon an alteration in distance between the first touch point 108 and the second touch point 110. For instance, if the user causes the distance between the first touch point 108 and the second touch point 110 to be decreased, the depth alterer component 126 can cause a view depth pertaining to the three-dimensional graphical object 104 and the user to be increased. This has the effect, for example, of moving a camera away from the three-dimensional graphical object 104. Alternatively, if the user causes the distance between the first touch point and the second touch point 110 to be increased, the depth alterer component 126 can decrease the view depth (e.g., the camera can be moved closer to the three-dimensional graphical object 104). These and other features will be described with graphical depictions herein.

It is to be understood that the rotator component 118, the translator component 122, the scaler component 124, and/or the depth alterer component 126 can act in conjunction to cause the three-dimensional object 104 to appear to be rotated, scaled, and/or translated simultaneously based at least in part upon movement of touch points along the touch-sensitive display surface 102 detected by the movement tracker component 116. Moreover, it is to be understood that other objects may appear with the three-dimensional object 104 on the touch-sensitive display surface 102. In such a case, if the three-dimensional object 104 is rotated/scaled/translated, appearance of other objects on the touch-sensitive display surface will remain unchanged while the appearance of the three-dimensional object 104 is altered. If the viewing perspective is rotated, translated, or otherwise altered, the appearance of other objects in a scene with the three-dimensional object 104 will also change.

Figure 2:
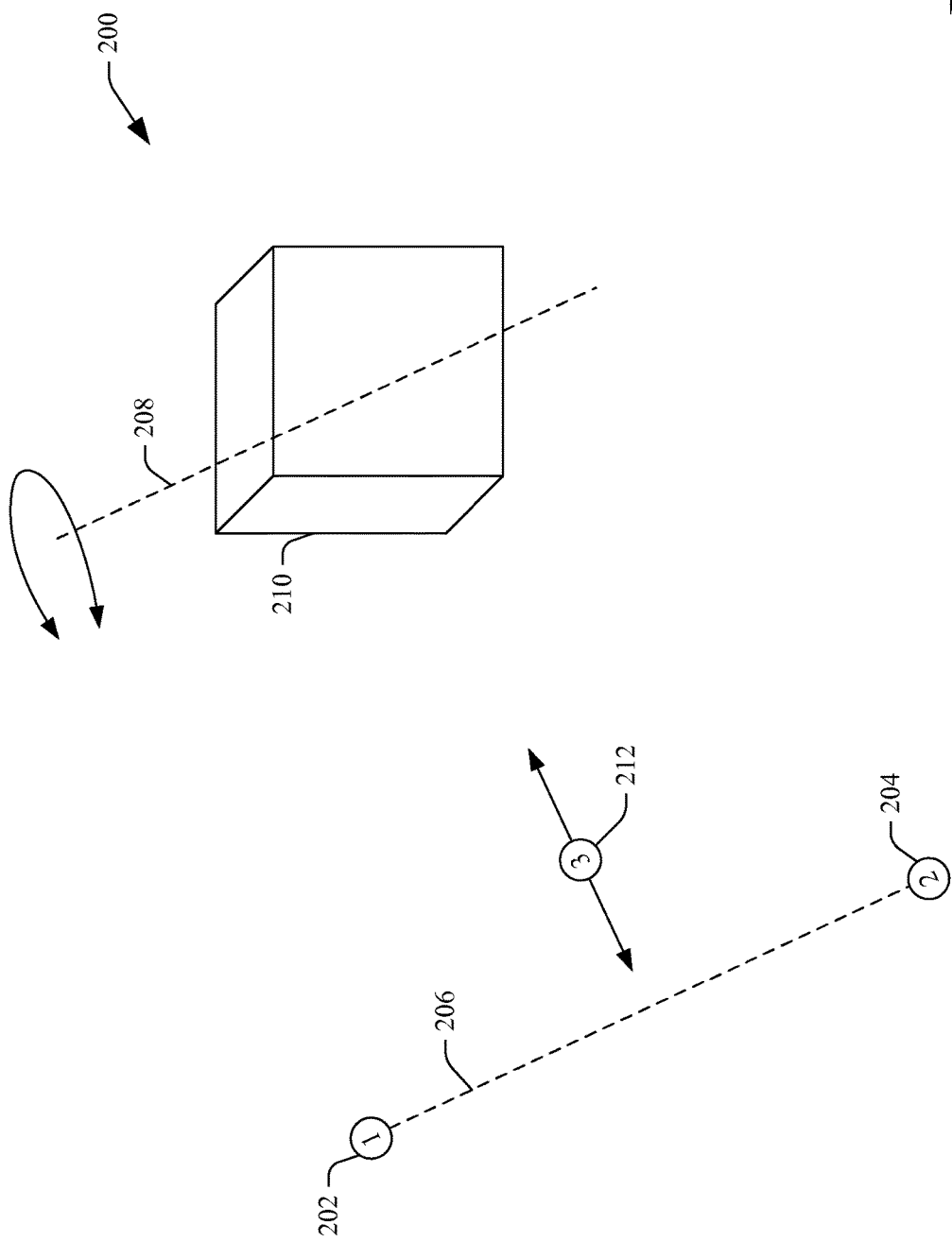
FIG. 2 is an example depiction of orientation of three touch points that cause a three-dimensional graphical object to appear to be rotated about an axis in a multi-touch display.

Referring now to FIG. 2, an example graphical depiction 200 illustrating a three-dimensional graphical object being rotated about an axis defined by two touch points is illustrated. While the examples shown and described herein refer to rotation of a three-dimensional graphical object being rotated about an axis, it is to be understood that the viewing perspective of a user can be rotated about the axis. The graphical depiction 200 includes a first touch point 202, which is established by a user placing a first member in contact with a touch-sensitive display surface. The graphical depiction 200 also includes a second touch point 204 that is established by the user placing a second member in contact with the touch-sensitive display surface. A line 206 is provided to illustrate a connection between the first touch point 202 and the second touch point 204. Once the first touch point 202 and the second touch point 204 are established, a first axis 208 can be established through a centroid of a three-dimensional graphical object 210 displayed on the touch sensitive display surface. As can be ascertained, the first axis 208 is substantially parallel to the line 206 that connects the first touch point 202 and the second touch point 204.

To rotate the three-dimensional graphical object 210, the user can move a third member to cause a third touch point 212 to be moved along the touch-sensitive display surface substantially perpendicularly to the first axis 208. For instance, if the user causes the third touch point 212 to be moved closer to the line 206, then the three-dimensional graphical object 210 can be rotated in a first direction about the first axis 208. If the user causes the third touch point 212 to be moved further away from the line 206, then the three-dimensional graphical object 210 can be rotated about the first axis 208 in a second direction that is opposite the first direction.

Figure 3:
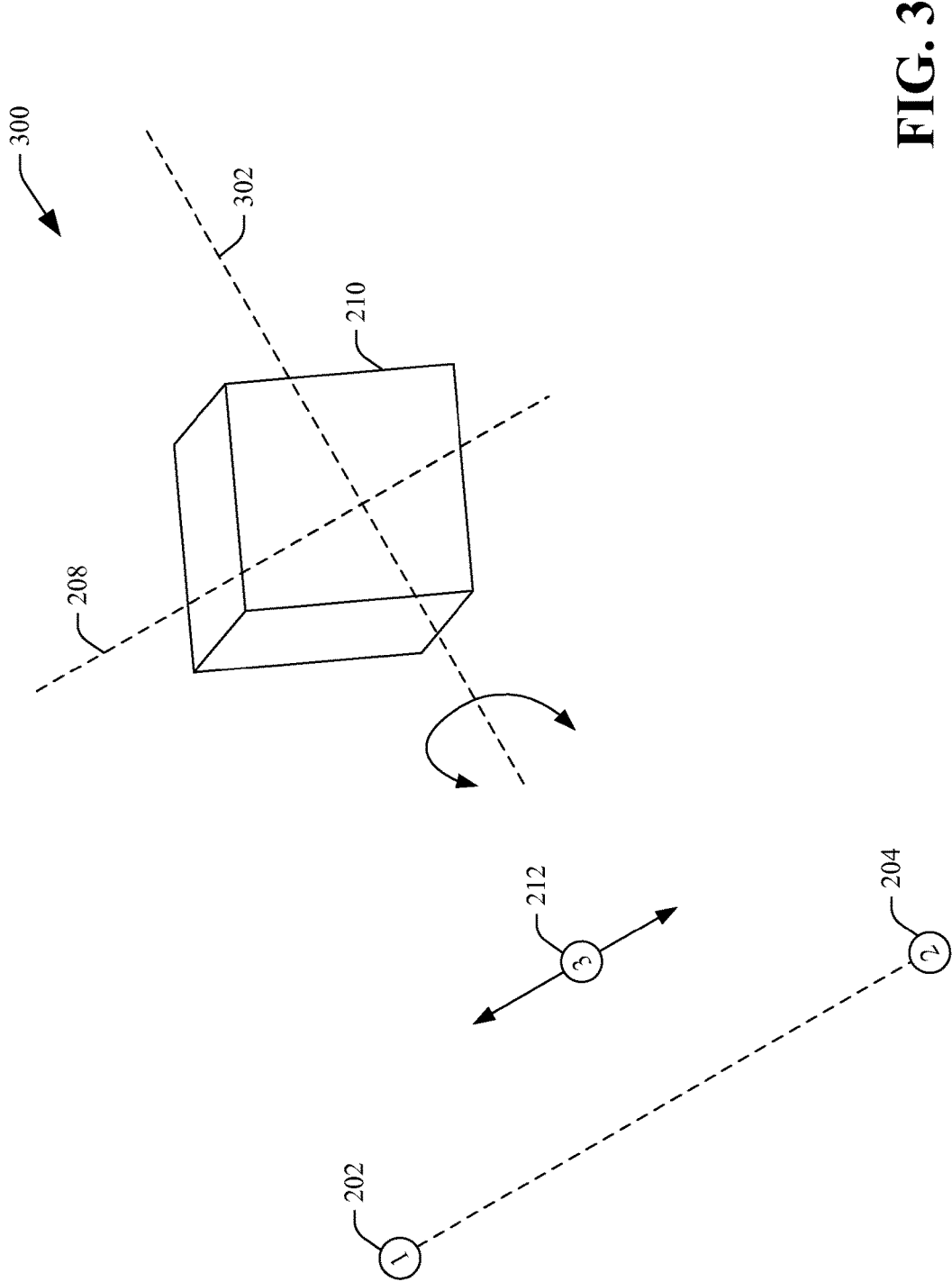
FIG. 3 is an example depiction of orientation of three touch points that cause a three-dimensional graphical object to appear to be rotated about an axis in a multi-touch display.

With reference now to FIG. 3, a graphical depiction 300 of a three-dimensional object being rotated about a second axis is illustrated. The graphical depiction 300 includes the first touch point 202, the second touch point 204, and the third touch point 212. The graphical depiction 300 also includes the three-dimensional graphical object 210 and the first axis 208. Upon the first touch point 202 and the second touch point 204 being established (e.g., the first two touch points established with respect to a touch-sensitive display surface), the first axis 208 can be created, wherein the first axis is substantially parallel to the line 206 connecting the first touch point 202 and the second touch point 204. Additionally, a second axis 302 can be established through the centroid of the three-dimensional graphical object 210, wherein the second axis 302 is substantially perpendicular to the first axis 208 and is in the same plane as the first axis 208 (e.g., the plane that is substantially parallel to the touch sensitive display surface).

To cause the three-dimensional graphical object 210 to rotate about the second axis 302, the user can cause the third touch point 212 to be moved substantially parallel to the line 206 connecting the first touch point 202 and the second touch point 204 (and also substantially parallel to the first axis 208 and substantially perpendicular to the second axis 302). For instance, if the user causes the third touch point 212 to be moved toward the first touch point 202, the three-dimensional graphical object 210 can be rotated about the second axis 302 in a first direction, and if the user causes the third touch point 212 to be moved closer to the second touch point 204 (substantially parallel to the line 206), then the three-dimensional graphical object 210 can be rotated about the second axis 302 in a second direction that is opposite the first direction. If the user causes the third touch point 212 to be moved in a manner that is diagonal to the line 206, then the three-dimensional graphical object 210 can be rotated about both the first axis 208 and the second axis 302.

Figure 4:
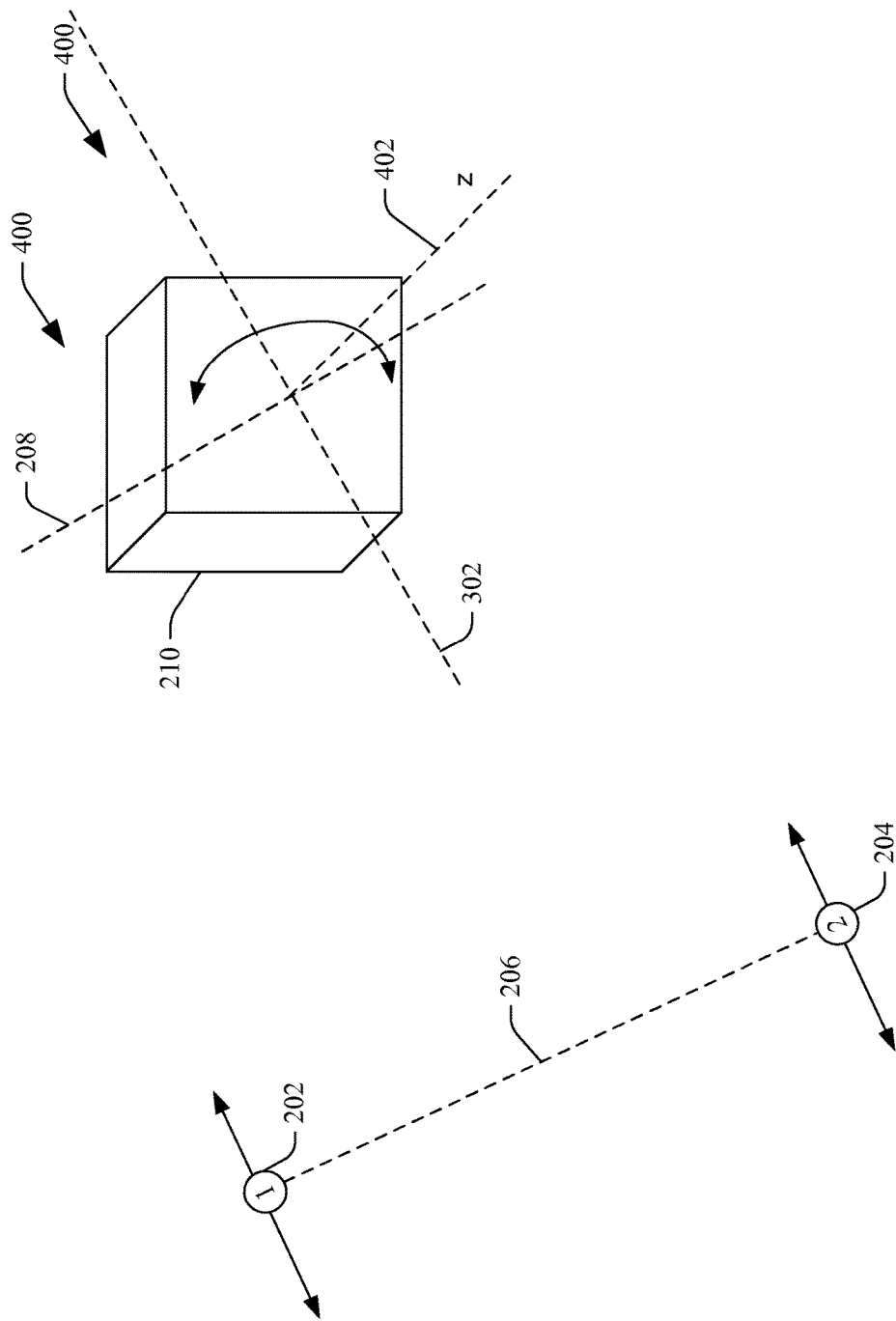
FIG. 4 is a graphical depiction illustrating utilization of two touch points on a multi-touch apparatus to cause a three-dimensional object to appear to rotate about a z-axis.

With reference now to FIG. 4, an example graphical depiction 400 that illustrates rotation of a three-dimensional graphical object about a z axis in a touch-sensitive display surface is illustrated. The graphical depiction 400 includes the first touch point 202 and the second touch point 204, which when established can cause creation of the first axis 208 and the second axis 302 as described above, through the centroid of the three-dimensional graphical object 210. When such touch points are established, a z axis 402 can be established through the centroid of the three-dimensional graphical object 210, wherein the z axis is substantially perpendicular to a plane established by the first axis 208 and the second axis 302 (e.g., substantially perpendicular to a plane of the touch-sensitive display surface).

To cause the three-dimensional graphical object 210 to be rotated about the z axis 402, the user can cause the first touch point 202 and/or the second touch point 204 to be rotated with respect to one another. For instance, the user can cause the second touch point to be anchored while moving the first touch point 202 in a direction that is substantially perpendicular to the line 206 that connects the first point 202 and the second touch point 204. Causing the first touch point 202 to be moved with respect to the second touch point 204 in such a way can cause the graphical object 210 to be rotated about the z axis in a direction consistent with direction of movement of the first touch point 202 with respect to the second touch point 204. In another example, the user can simultaneously move the first touch point 202 and the second touch point 204 to rotate such touch points 202 and 204 about an axis that is proximate to a center point of the line 206. Again, this can cause the three-dimensional graphical object 210 to be rotated about the z axis 402 in a direction consistent with the rotation of the first and second touch points 202 and 204.

Figure 5:
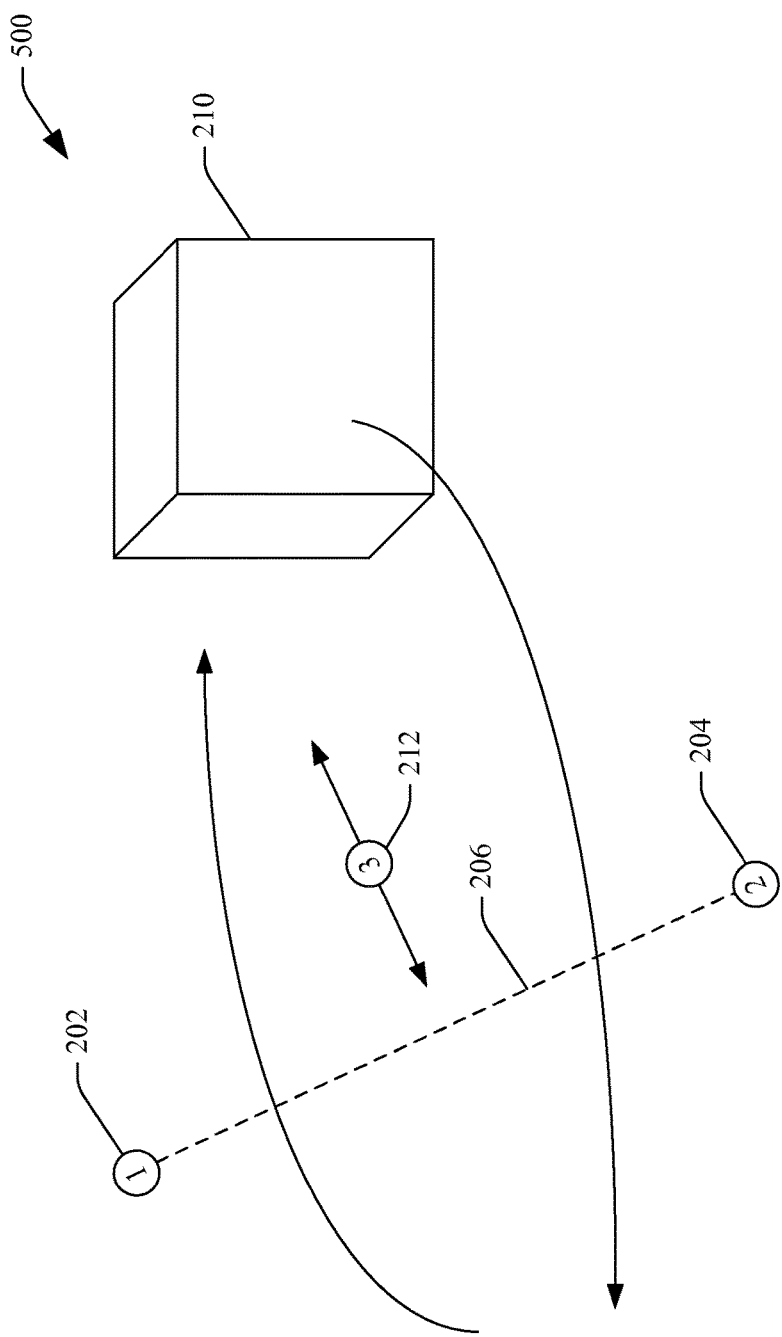
FIG. 5 is a graphical depiction of utilization of three touch points to cause a three-dimensional graphical object to appear to revolve and rotate about an axis in a multi-touch display.

Now referring to FIG. 5, an example graphical depiction 500 of a three-dimensional graphical object being rotated and revolved about an axis established by two touch points is illustrated. In the example depicted in the graphical depiction 500 of FIG. 5, a line 206 connecting the first touch point 202 and the second touch point 204 can act as an axis of rotation as well as an axis of revolution. Thus, the user can cause the third touch point 212 to be moved substantially perpendicularly to the line 206 (the axis of rotation and revolution), which can cause the three-dimensional graphical object 210 to simultaneously rotate and revolve about the line 206. Direction of rotation/revolution can depend upon direction that the third touch point 212 is moved (e.g., either toward the line 206 or away from the line 206).

Figure 6:
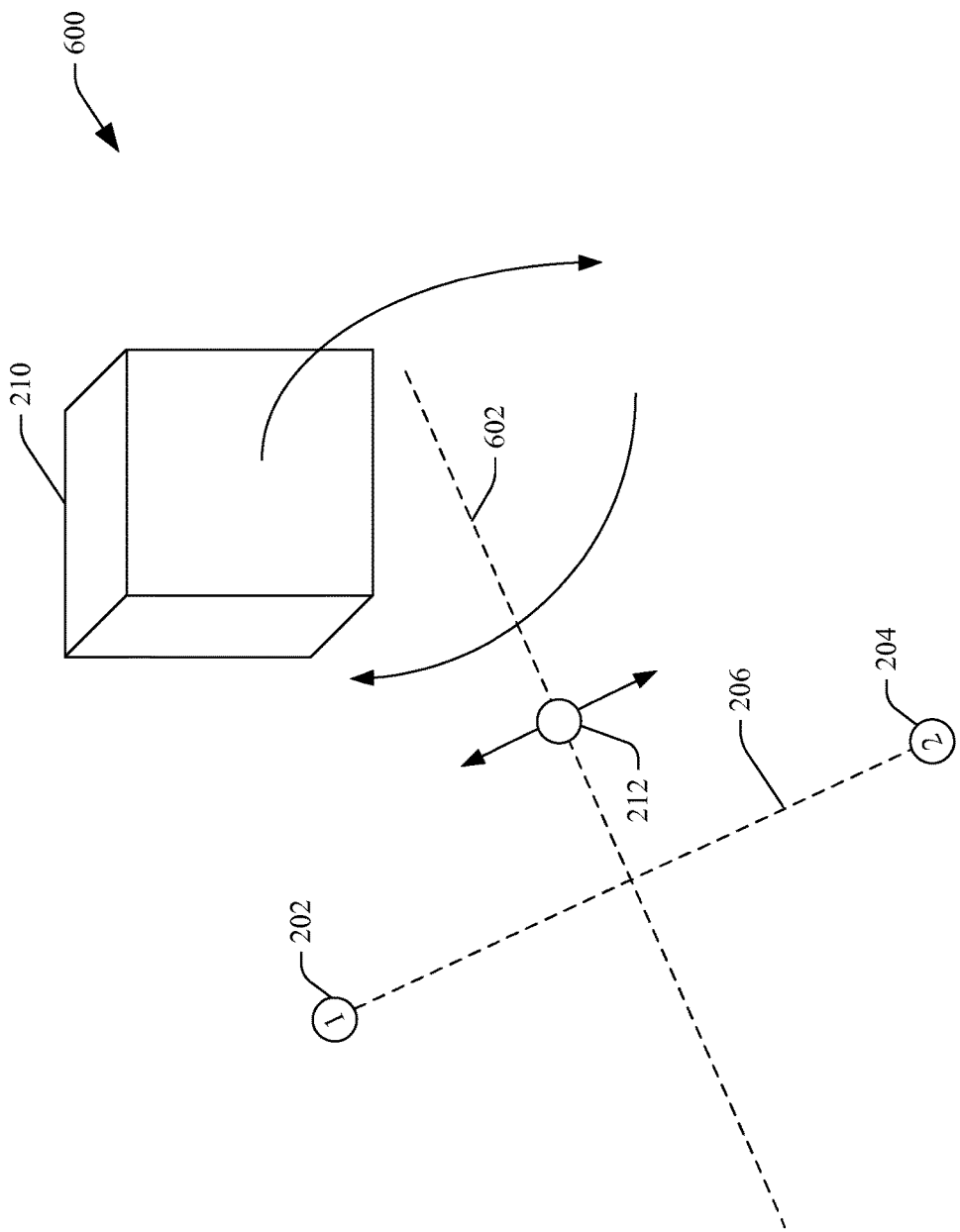
FIG. 6 is a graphical depiction of utilization of three touch points on a multi-touch display to cause a three-dimensional object to appear to revolve and rotate about an axis.

Turning now to FIG. 6, an example graphical depiction 600 that facilitates rotating/revolving the graphical object 210 about a second axis of rotation/revolution is illustrated. In this example, when the first and second touch points 202 and 204 are established on a touch-sensitive display surface, a second axis 602 can be created, wherein the second axis is perpendicular to the line 206 that connects the first touch point 202 and the second touch point 204, and is at approximately a center point of the line 206. The user can utilize the third touch point 212 to cause the three dimensional graphical object 210 to revolve and rotate about the second axis 602, depending on direction of movement of the third touch point 212 along the touch-sensitive display surface. For example, if the user causes the third touch point 212 to be moved closer to the first touch point 202, then the three dimensional graphical object 210 can be revolved/rotated about the second axis 602 in a first direction, while if the user causes the third touch point 212 to be moved farther from the first touch point 202 (toward the second touch point 204), the three-dimensional graphical object 210 can be revolved/rotated in a second direction that is opposite the first direction. While not shown, location of a z-axis can be established at the intersection of the line 206 and the second axis 602, and the three-dimensional graphical object 210 can be revolved/rotated about the z-axis by rotating the first touch point 202 and the second touch point 204 with respect to one another.

Figure 7:
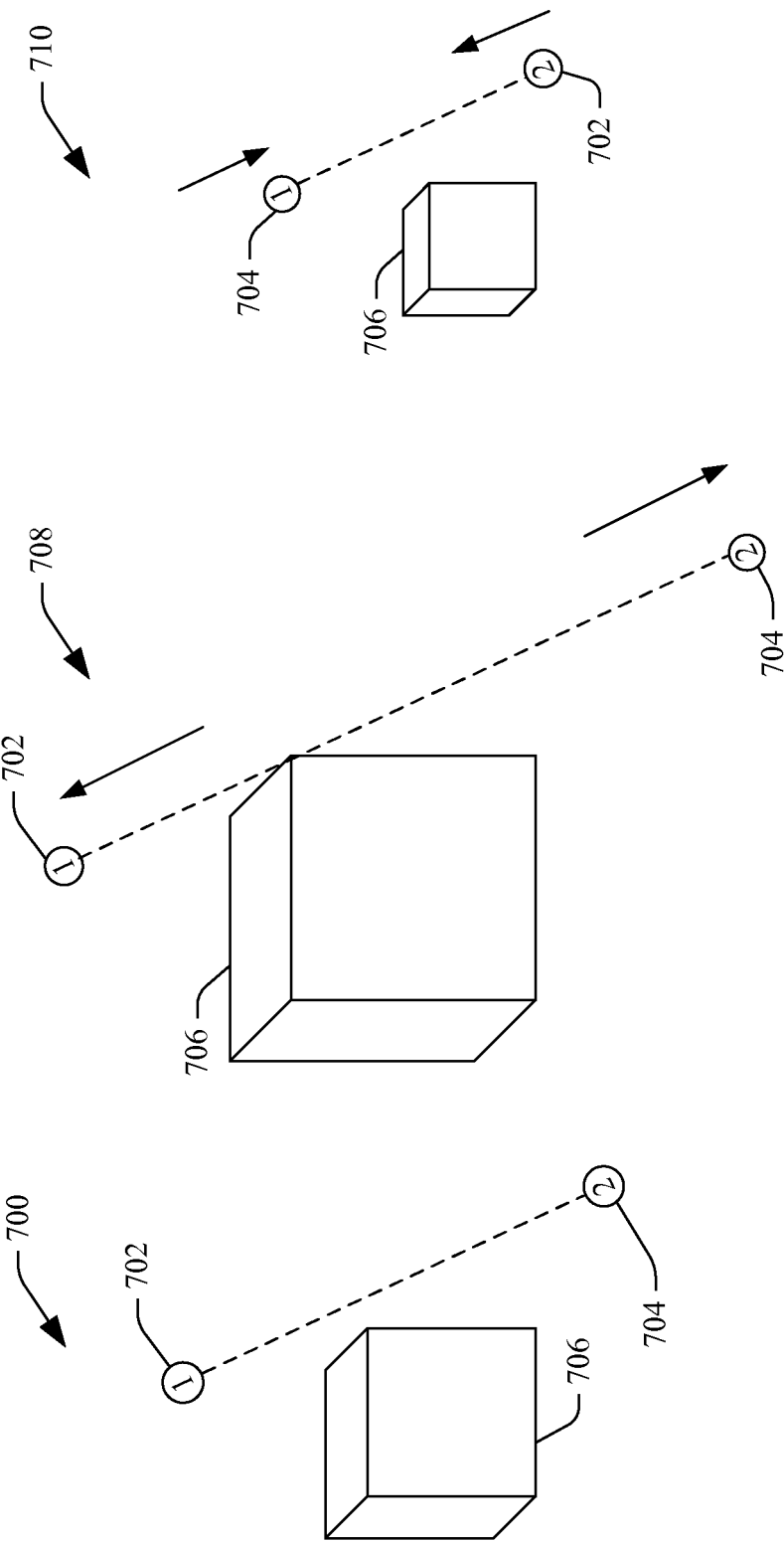
FIGS. 7A, 7B, and 7C illustrate altering scale or view depth pertaining to a three-dimensional object in a multi-touch display.

With reference now to FIG. 7A, an example depiction 700 of a three-dimensional graphical object being scaled and/or viewed pertaining to three-dimensional graphical object being altered is illustrated. In the example shown in FIG. 7A, a first touch point 702 and a second touch point 704 are established with respect to a three-dimensional graphical object 706 on a touch-sensitive display surface.

Referring to FIG. 7B, another example depiction 708 is illustrated, wherein such depiction illustrates that the user can cause a distance between the first touch point 702 and the second touch point 704 to be increased by moving one or more of the first touch point 702 and the second touch point 704 away from the other respective touch points. In a first embodiment, this can cause a scale of the three-dimensional graphical object 706 to be increased, such that the three-dimensional graphical object 706 is made larger. In a second embodiment, changing the distance between the first and second touch points 702 and 704 can cause a view depth pertaining to the three-dimensional graphical object 706 to be decreased, such that the three-dimensional graphical object 706 is not scaled, but is just shown to be closer in distance to the viewer.

Turning to FIG. 7C, another example depiction 710 is illustrated, wherein such depiction illustrates that the user can cause a distance between the first touch point 702 and the second touch point 704 to be decreased by moving either or both of the first touch point 702 and the second touch point 704 closer to one another. In a first example, this can cause a scale of the three-dimensional graphical object 706 to be decreased, thereby causing the three-dimensional graphical object 706 to become smaller. In a second example, decreasing the distance between the first touch point 702 and the second touch point 704 can cause the view depth to become greater, thereby effectively increasing a distance between the viewer and the three-dimensional graphical object 706. Whether the graphical object 706 is scaled or a view depth is changed upon changing distance between the first and second touch points 702 and 704 may depend upon an application, and/or can be selected by the user. While not shown, a single touch point can be used to either move the three dimensional graphical object 706 in space along a plane substantially parallel to the touch-sensitive display surface without rotating or scaling the three-dimensional graphical object 706. In another example, rather than moving the three-dimensional graphical object 706, a single touch point can be used to alter the position of view of the user such that position of the three-dimensional graphical object 706 remains the same, but a view position of the user in the plane alters. Again, this can be a feature that can be selected by a user or dependent upon an application.

Figure 8:
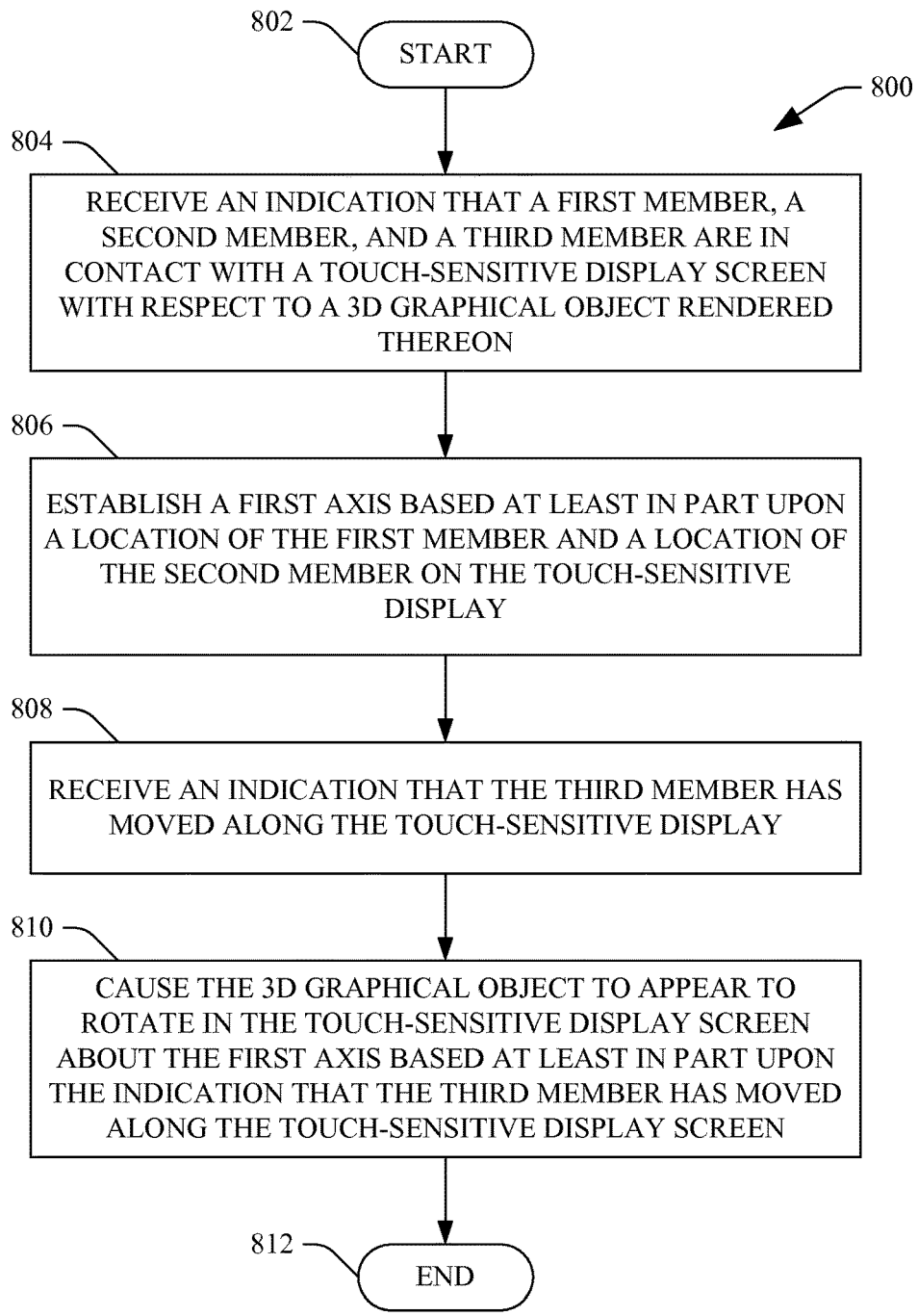
FIG. 8 is a flow diagram that illustrates an example methodology for causing a three-dimensional graphical object to appear to rotate in a multi-touch display about an axis defined by two touch-points.
Figure 9:
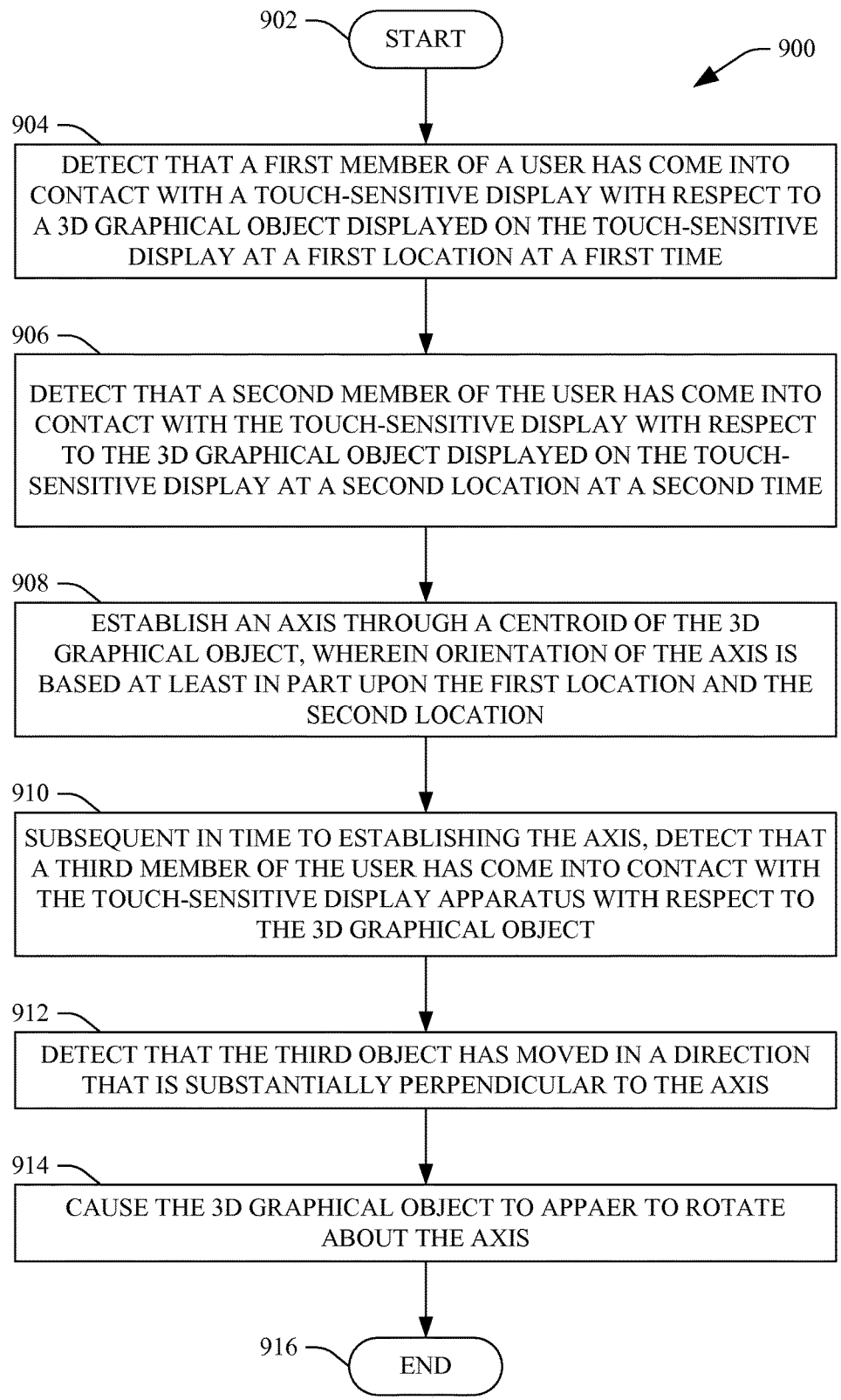
FIG. 9 is a flow diagram that illustrates an example methodology for causing a three-dimensional graphical object to appear to rotate about an axis in a multi-touch display, wherein the axis is defined by an order of touch-points.

With reference now to FIGS. 8 and 9, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 8, a methodology 800 that facilitates causing a three-dimensional graphical object to appear to rotate in a touch-sensitive display utilizing three touch points is illustrated. The methodology 800 begins at 802, and at 804 an indication that a first member, a second member, and a third member of a user are in contact with a touch-sensitive display screen with respect to a three-dimensional graphical object that is graphically rendered thereon is received. For instance, the first member, the second member, and the third member can create three touch points on the touch-sensitive graphical display.

At 806, a first axis is established based at least in part upon a location of the first member on the touch-sensitive display screen and a location of the second member on the touch-sensitive display screen (e.g., the locations of the first and second touch points).

At 808, an indication is received that the third member is moved along the touch-sensitive display screen. For instance, the third member can be moved in a direction that is substantially perpendicular to the first axis established at 806.

At 810, the three-dimensional graphical object is caused to appear to be rotated in the touch-sensitive display screen about the first axis based at least in part upon the indication that the third member has moved along the touch sensitive display screen. The methodology 800 completes at 812.

With reference now to FIG. 9, an example methodology 900 that facilitates causing a three-dimensional graphical object to appear to be rotated about an axis of rotation based at least in part upon location and/or movement of three touch points on a touch-sensitive display surface is illustrated. The methodology starts at 902, and at 904 a detection is made that a first member of a user has come into contact with a touch-sensitive display surface with respect to a three-dimensional object displayed on the touch-sensitive display surface at a first location at a first time.

At 906, a detection is made that a second member of the user has come into contact with the touch-sensitive display surface with respect to the three-dimensional object displayed on the touch-sensitive display surface at a second location at a second time. In an example, the second time can be equal to or greater to the first time, such that the second member was placed on the touch-sensitive display at substantially the same time that the first member was placed on the touch-sensitive display or thereafter.

At 908 an axis is established through a centroid of the three-dimensional graphical object, wherein an orientation of the axis is based at least in part upon the first location and the second location corresponding to the first member and the second member.

At 910, subsequent in time to establishing the axis, a detection is made that a third member of the user has come in contact with the touch-sensitive display apparatus with respect to the three dimensional graphical object. At 912, a detection is made that the third member is moved along the touch-sensitive display in a direction that is substantially perpendicular to the axis established at 908.

At 914, the three-dimensional graphical object is caused to appear to rotate about the axis in the touch-sensitive display upon detecting that the third member moves along the touch-sensitive display in a direction that is substantially perpendicular to the axis. The methodology 900 completes at 916.

Figure 10:
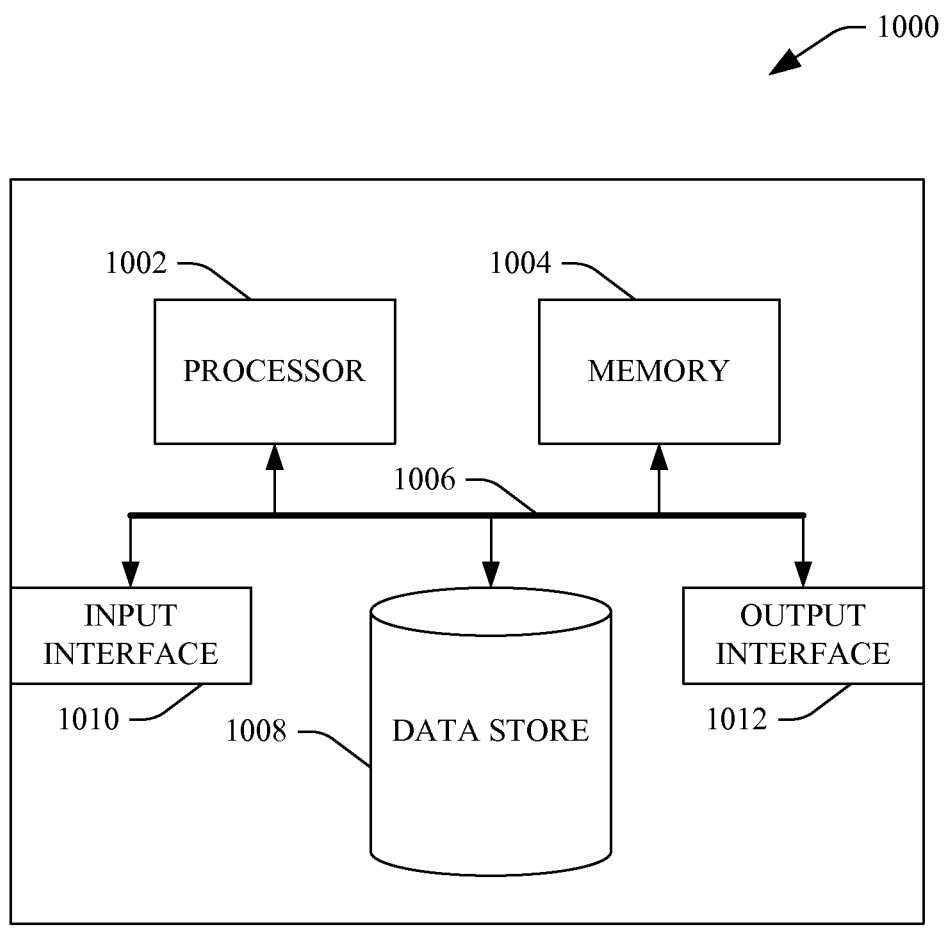
FIG. 10 is an example computing system.

Now referring to FIG. 10, a high-level illustration of an example computing device 1000 that can be used in accordance with the systems and methodologies disclosed herein is illustrated. For instance, the computing device 1000 may be used in a system that supports providing six degrees of freedom with respect to rotating/translating a three-dimensional object in a touch-sensitive display apparatus through utilization of three touch points. In another example, at least a portion of the computing device 1000 may be used in a system that supports rotating a three-dimensional object about an axis established by two touch points in a touch-sensitive display device. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store graphical objects to be rendered on a touch-sensitive display device.

The computing device 1000 additionally includes a data store 1008 that is accessible by the processor 1002 by way of the system bus 1006. The data store 1008 may include executable instructions, three-dimensional graphical objects, etc. The computing device 1000 also includes an input interface 1010 that allows external devices to communicate with the computing device 1000. For instance, the input interface 1010 may be used to receive instructions from an external computer device, receive data pertaining to touch points on a touch-sensitive display, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method that facilitates rendering a three-dimensional graphical object on a multi-touch display, the method comprising:
   receiving an indication that a first member and a second member of a user are in contact with a surface of the multi-touch display with respect to the three-dimensional object that is graphically rendered thereon, the first member is in contact with the surface of the multi-touch display at a first touch point, and the second member is in contact with the surface of the multi-touch display at a second touch point, wherein at least one of the first touch point or the second touch point is outside the three-dimensional graphical object;
   responsive to receiving the indication, establishing a first axis, the first axis extending through the first touch point and the second touch point;
   responsive to receiving the indication, establishing a second axis that is perpendicular to the first axis, the second axis extending through the first axis at a point midway between the first touch point and the second touch point;
   responsive to receiving the indication, establishing a third axis that is perpendicular to the first axis and the second axis, the third axis being orthogonal to the surface of the multi-touch display and extending through an intersection of the first axis and the second axis, wherein the intersection of the first axis, the second axis, and the third axis is displaced from a centroid of the three-dimensional object;
   subsequent to the first axis, the second axis, and the third axis being established, receiving an indication that at least one of the first member, the second member, or a third member is moved along the surface of the multi-touch display relative to at least one of the first axis, the second axis, or the third axis;
   and causing the three-dimensional graphical object to appear to rotate and revolve in the multi-touch display about at least one of the first axis, the second axis, or the third axis based upon the indication that the at least one of the first member, the second member, or the third member is moved along the surface of the multi-touch display relative to the at least one of the first axis, the second axis, or the third axis.

2. The method of claim 1, further comprising:
   receiving an indication that at least one of the first member or the second member is moved along the surface of the multi-touch display;
   re-establishing the first axis and the second axis based upon a new location of the at least one of the first member or the second member on the surface of the multi-touch display; and rotating and revolving the three-dimensional object about the third axis based upon the indication that the at least one of the first member or the second member is moved along the surface of the multi-touch display.

3. The method of claim 1, further comprising:
   detecting that the second member and the third member have been removed from the surface of the multi-touch display;
   subsequent to detecting that the second member and the third member have been removed from the surface of the multi-touch display, receiving an indication that the first member of the user is moved along the surface of the multi-touch display in a third direction; and causing the three-dimensional graphical object to appear to translate in a plane that is parallel to the surface of the multi-touch display in the third direction.

4. The method of claim 1, further comprising:
   receiving an indication that at least one of the first member or the second member are moved along the first axis on the surface of the multi-touch display;
   and altering view depth of the object based upon the indication that at least one of the first member or the second member has moved along the first axis on the surface of the multi-touch display.

5. The method of claim 4, wherein movement of the at least one of the first member or the second member causes a distance between the first member and the second member to be increased, and wherein altering view depth of the object comprises decreasing the view depth of the object.

6. The method of claim 4, wherein movement of the at least one of the first member or the second member causes a distance between the first member and the second member to be decreased, and wherein altering view depth of the object comprises increasing the view depth of the object.

7. The method of claim 1, further comprising:
receiving an indication that at least one of the first member or the second member is moved along the first axis on the surface of the multi-touch display;
and altering scale of the three-dimensional object based at least in part upon the indication that at least one of the first member or the second member has moved along the first axis.

8. The method of claim 7, wherein movement of the at least one of the first member or the second member causes a distance between the first member and the second member to be increased, and wherein altering scale of the object comprises increasing the scale of the object.

9. The method of claim 7, wherein movement of the at least one of the first member or the second member causes a distance between the first member and the second member to be decreased, and wherein altering scale of the object comprises decreasing the scale of the object.

10. The method of claim 1, further comprising:
detecting that the third member is moved perpendicularly to the second axis along the surface of the multi-touch display; and restricting rotation and revolution of the three-dimensional object to rotation and revolution about the second axis.

11. The method of claim 1, further comprising:
establishing the first axis, the second axis, and the third axis based upon an order in time in which the first member, the second member, and the third member are placed in physical contact with the surface of the multi-touch display.

12. The method of claim 1, further comprising:
receiving an indication of pressure applied to the surface of the multi-touch display by at least one of the first member, the second member, or the third member; and causing the three-dimensional graphical object to appear to rotate about the first axis based upon the indication of pressure.

13. A system that facilitates rendering a three-dimensional graphical object on a touch-sensitive display, the system comprising:
at least one processor;
and memory storing instructions that, when executed by the at least one processor, cause the at least one processor to perform acts comprising:
receiving an indication that a first member, a second member, and a third member are in contact with a surface of the touch-sensitive display at a first touch point, a second touch point, and a third touch point, respectively, wherein at least one of the first touchpoint or the second touchpoint is outside the three-dimensional object;
establishing a first axis and a second axis based upon the first touch point and the second touch point, the first axis extending through first touch point and the second touch point, the second axis being perpendicular to the first axis, parallel with the surface of the touch-sensitive display, and extending through the first axis midway between the first touch point and the second touch point, neither the first axis nor the second axis extending through a centroid of the graphical object;
determining that the third touch point has moved along the surface of the touch-sensitive display in a first direction, the first direction being parallel to the first axis;
and causing the graphical object to appear to rotate and revolve about the second axis responsive to determining that the third touch point has moved along the surface of the touch-sensitive display in the first direction.

14. The system of claim 13, wherein a mobile computing device comprises the at least one processor and the memory.

15. A computing device comprising:
at least one processor; and
memory comprising instructions that, when executed by the at least one processor, cause the at least one processor to perform acts comprising:
detecting that a first member of a user has come into contact with a touch-sensitive display at a first location outside a three-dimensional object and at a first time, the three-dimensional object displayed on the touch-sensitive display;
detecting that a second member of the user has come into contact with the touch-sensitive display at a second location outside the three-dimensional object and at a second time, wherein the second time is equal to or greater than the first time;
establishing a first axis and a second axis responsive to detecting that the first member of the user has come into contact with the touch-sensitive display and the detecting that the second member of the user has come into contact with the touch-sensitive display, the first axis established through the first location and the second location, and wherein the second axis is perpendicular to the first axis, parallel to the touch-sensitive display, and extending through the first axis midway between the first location and the second location, neither the first axis nor the second axis extending through a centroid of the three-dimensional object;
subsequent in time to establishing the first axis and the second axis, detecting that a third member of the user has come into contact with the touch-sensitive display at a third location;
detecting that the third member moves along the touch sensitive display in a direction that is perpendicular to the second axis;
and causing the three-dimensional graphical object to appear to rotate and revolve in the touch-sensitive display about the second axis upon detecting that the third member moves along the touch sensitive display in the direction that is perpendicular to the second axis.

* * * * *